United States Patent [19]

Russell

[11] 4,179,646
[45] Dec. 18, 1979

[54] CONTROL CIRCUIT FOR CIRCUIT BREAKER DC MOTOR OPERATOR

[75] Inventor: Ronald R. Russell, Plainville, Conn.

[73] Assignee: General Electric Company, New York, N.Y.

[21] Appl. No.: 889,755

[22] Filed: Mar. 24, 1978

[51] Int. Cl.² .............................................. H02P 3/12
[52] U.S. Cl. ................................... 318/380; 318/364; 318/369; 318/447
[58] Field of Search .............. 318/375, 379, 380, 364, 318/365, 369, 447, 284

[56] References Cited

U.S. PATENT DOCUMENTS

| 2,726,363 | 12/1965 | Scully ..................................... 318/379 |
| 3,017,555 | 1/1962 | Newman et al. ..................... 318/380 |
| 3,303,404 | 2/1967 | Raub, Jr. .............................. 318/447 |
| 3,715,642 | 2/1973 | Walter ................................... 318/375 |
| 4,042,896 | 8/1977 | Powell et al. .......................... 335/17 |

Primary Examiner—Gene Z. Rubinson
Assistant Examiner—M. K. Mutter
Attorney, Agent, or Firm—Robert A. Cahill; Walter C. Bernkopf; Philip L. Schlamp

[57] ABSTRACT

A circuit breaker motor operator control circuit utilizes the voltage developed across a dynamic braking resistor during breaking of a permanent magnet DC motor to prevent re-energization of the motor until it has been braked to a virtual stop. The control circuit also includes a timing network operating to prevent continued pumping of the breaker operating mechanism by the motor operator should the operating mechanism for some reason fail to become charged within a prescribed time period.

9 Claims, 1 Drawing Figure

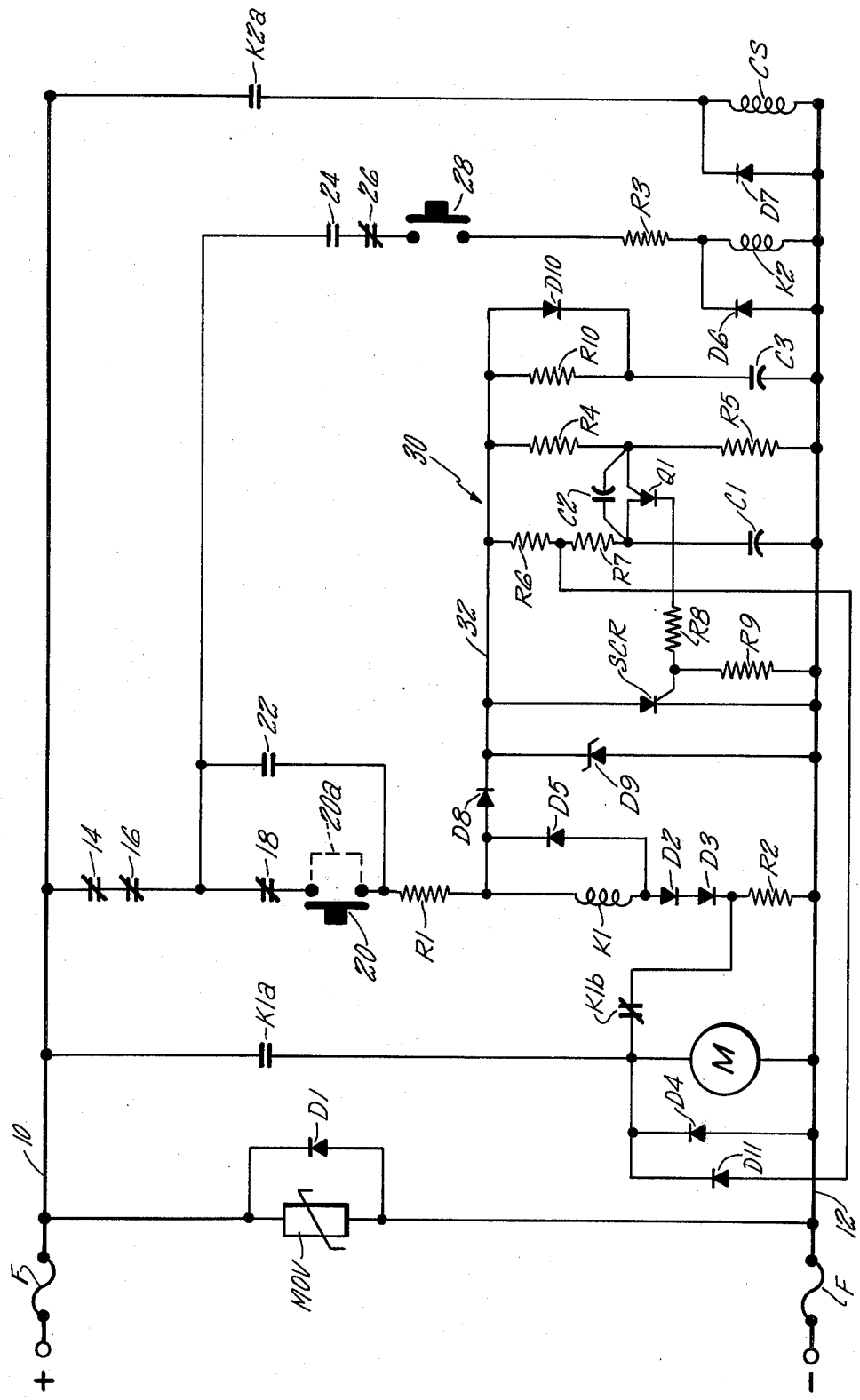

4,179,646

CONTROL CIRCUIT FOR CIRCUIT BREAKER DC MOTOR OPERATOR

BACKGROUND OF THE INVENTION

The present invention relates to circuit breaker motor operator control circuits, and specifically to improvement over the motor operator control circuit disclosed in U.S. Pat. No. 4,042,896, whose disclosure is specifically incorporated herein by reference.

A common practice in circuit breaker motor operators using permanent magnet DC motors is to simply remove power and then abruptly switch a braking resistor across the motor armature. The motor then becomes a generator whose current output is forced to flow through the braking resistor. Dynamic braking is thus imposed on the motor, and its output shaft is abruptly braked to a stop. This approach, while imminently simple and effective will develop problems if several unfortunately common situations are permitted to occur. If, while the motor is being braked, the control circuit is signalled to re-energize the motor, arcing occurs as relay contacts operate to switch out the braking resistor and to switch in the line voltage across the motor armature. If the arc across the contacts switching out the braking resistor does not clear, line voltage will be imposed across the braking resistor via this persistent arc. Under these circumstances, this arc may never clear and the braking resistor would then soon burn out. This situation simply underlines a basic problem which can develop if the motor is permitted to be re-energized before it has been substantially braked to a stop, even apart from the arcing consideration. If this situation occurs repeatedly, overheating results and, if persistent, both the motor and the braking resistor can be destroyed.

An additional, unrelated problem is engendered if for some reason the breaker operating mechanism fails to become charged after the motor operator has gone through a charging cycle. The typical culprit is an undervoltage release which, because of an internal malfunction or a persistent undervoltage condition, has assumed a condition disabling the breaker latch. If the motor operator control circuit logic is established for automatic recharging of the breaker mechanism, the operator will continuously recycle in repeated, vain attempts to charge the breaker mechanism. This so-called "pumping" situation is extremely hard on the breaker mechanism, not to mention the motor operator itself which is typically not designed for such a demanding duty cycle.

It is accordingly an object of the present invention to provide an improved control circuit for a circuit breaker motor operator mechanism.

An additional object is to provide a circuit breaker motor operator control circuit of the above character which is equipped to automatically prevent indiscriminate re-energization of the motor.

Yet another object is to provide a control circuit of the above character which automatically operates to prevent energization of the motor until it has been substantially braked to a stop.

A further object is to provide a control circuit of the above character which incorporates an anti-pumping feature.

Another object of the present invention is to provide a control circuit of the above character which is inexpensive to manufacture, relatively simple, and yet reliable in operation.

Other objects of the invention will in part be obvious and in part appear hereinafter.

SUMMARY OF THE INVENTION

In accordance with the present invention, there is provided an improved control circuit for circuit breaker motor operators utilizing permanent magnet DC motors with dynamic braking. When using dynamic braking, sets of relay contacts operate to disconnect power from the motor and connect a braking resistor across the motor, which then acts as a generator pumping current through the braking resistor. Under these circumstances, the motor is quickly braked to a stop. Pursuant to the present invention, the braking resistor is connected in series with the relay coil controlling these sets of relay contacts across DC power buses for the motor and control circuit. When motor braking is to be initiated the energization circuit for this relay coil is interrupted. De-energization of the relay coil causes one set of contacts to open, disconnecting the motor from the power buses, while another set closes to connect the braking resistor across the motor. The voltage developed across the braking resistor by the motor acting as a generator effectively bucks the flow of current through the relay coil should a premature attempt be made to re-establish the energization circuit for the relay coil between the power buses. It is only until the motor is substantially braked to a stop that this bucking voltage across the braking resistor decays to a value low enough to permit the flow of an activating level of energizing current through the relay coil. As a consequence, re-energization of the motor can not occur until the braking cycle has been substantially completed, thereby affording effective protection to the braking resistor and motor.

As an additional feature of the present invention, the control circuit includes a timing circuit which operates to automatically prevent continued energization of the motor switching relay if the circuit breaker operating mechanism is not successfully charged by the motor operator within a pre-established time period. As a result, needless "pumping" of the breaker operating mechanism is avoided.

The invention accordingly comprises the features of construction, combination of elements and arrangement of parts which will be exemplified in the construction hereinafter set forth, and the scope of the invention will be indicated in the claims.

For a fuller understanding of the nature and objects of the present invention, reference should be had to the following detailed description taken in connection with the accompanying drawing, in which the sole FIGURE is a detailed circuit schematic diagram of a circuit breaker motor operator control circuit constructed in accordance with the invention.

DETAILED DESCRIPTION

Referring to the drawing, a suitable source of DC voltage is connected to supply a positive voltage bus 10 and a negative voltage bus 12 through fuses F. A metal oxide varistor MOV is connected across these buses for transient voltage suppression. Reverse voltage protection for the control circuit is provided by a diode D1 which will conduct sufficient current to blow the fuses F if the polarity of the source connections to buses 10 and 12 is reversed. A permanent magnet DC motor M is connected in series with a set of normally open relay contacts K1a across buses 10 and 12. Also connected across these DC voltage buses is a series circuit including three normally closed motor operator logic switches 14, 16 and 18, a normally open charge command pushbutton switch 20, a voltage dropping resistor R1, the relay operating coil K1 for contacts K1a, a pair of diodes D2 and D3, and a dynamic braking resistor R2 for motor M. The upper terminal of the motor is connected to the upper terminal of braking resistor R2 through a second set of normally closed relay contacts K1b operated by relay coil K1. Free-wheeling diodes D4 and D5 are connected across the motor and the relay coil, respectively.

Normally closed logic switches 14, 16 and 18, as well as a normally open logic switch 22 shunting logic switch 18 and push-button switch 20, are utilized to sense the conditions of the motor operator mechanism and circuit breaker pursuant to coordinating the control circuit thereto. If the circuit breaker is equipped with a manual charging capability, logic switch 14 may be an interlock switch operating to disarm the motor operator control circuit during manual charging of the circuit breaker. In this context, logic switch 14 may correspond to handle interlock switch 86 disclosed in the above-noted U.S. Pat. No. 4,042,896. Logic switch 16 may correspond to switch 182 disclosed in this patent as being utilized to sense whether the breaker contacts are opened or closed. That is, logic switch 16 remains closed as long as the breaker contacts are open, thereby enabling the initiation of a breaker charging cycle by the motor operator. However, while the breaker contacts are closed, logic switch 16 remains in its open condition to inhibit the initiation of a needless charging cycle. Logic switch 18 may be utilized in the same context as logic switch 180 disclosed in this patent for sensing when during the charging cycle the breaker operating mechanism has been reset. Thus, this logic switch is normally closed and opens only upon resetting of the breaker operating mechanism. Logic switch 22 may correspond to logic switch 136 of this patent, and thus is utilized to sense whether or not the motor operator mechanism is in its home position. That is, switch 22 would be open while the operator mechanism is in its home position and closes automatically in response to movement of the motor operator mechanism away from its home position while executing a breaker operating mechanism charging cycle.

To initiate a charging cycle by the motor operator mechanism, charge command pushbutton switch 20 is closed to complete the series energization circuit for relay coil K1. This relay pulls in, making its contacts K1a and breaking its contacts K1b, thereby applying power to motor M and switching out braking resistor R2 from across its armature. As the motor operating mechanism leaves its home position to start into a charging cycle, logic switch 22 closes to shunt logic switch 18 and pushbutton switch 20, thereby sealing in the energization circuit for relay coil K1. Consequently, momentary depression of the charge command pushbutton switch to initiate a charging cycle is accommodated, and the opening of logic switch 18 upon resetting of the breaker operating mechanism during the charging cycle does not affect the energization circuit for relay coil K1.

Upon return of the motor operator mechanism to its home position at the conclusion of a charging cycle, logic switch 22 opens to interrupt the energization circuit for relay coil K1, and this relay drops out. Relay contacts K1a, open to remove power from the motor and relay contacts K1b close to connect the braking resistor R2 across the motor armature. The motor, then acting as a generator, pumps current through braking resistor R2, and it is abruptly dynamically braked to a stop. It will be noted that during this dynamic braking cycle, the motor, in functioning as a generator, develops a positive voltage at the junction of diode D3 and braking resistor R2. In fact, at the very beginning of the dynamic braking cycle, this positive voltage will be substantially equal to the positive voltage on positive bus 10. Under normal circumstances, logic switches 18 and 22 are open at the conclusion of a charging cycle, and thus a new charging cycle can not be immediately initiated even with closure of pushbutton switch 20. However, if during a charging cycle the relay momentarily drops out and then pulls in, because of a momentary loss of voltage on bus 10, teasing of the pushbutton switch contacts, or a faulty logic switch, contacts K1a can reclose before the braking cycle has been substantially completed. Not only is this situation detrimental to the motor, but if the arc drawn between the relay contacts K1b as they open has not cleared when full line voltage is applied to the motor through relay contacts K1a, this line voltage can be applied via this arc across braking resistor R2. Under these circumstances, this arc may never clear, and excessive current will be caused to flow through braking resistor R2, to its detriment. Moreover, this persistent arcing will have damaging consequences on relay contacts K1b.

By connecting the braking resistor into the energization circuit for relay coil K1, this situation is automatically prevented. This is seen from the fact that the positive voltage developed at the junction of resistor R2 and diode D3 is effective, at least during a major portion of the dynamic braking cycle, in blocking the flow of energizing current through relay coil K1. In fact, since the positive voltage on bus 10 is applied to relay coil K1 through dropping resistor R1, diode D3 is back-biased by the voltage at its cathode generated by the motor acting as a generator until the motor has been dynamically braked to substantially a complete stop. At this point, the motor can be safely re-energized, and, since any arcing across relay contacts K1b is then of a significantly reduced character, the possibility of ever applying full line voltage across braking resistor R2 is exceedingly remote.

The junction between logic switches 16 and 18 is connected through a normally open logic switch 24, a normally closed logic switch 26, a normally open, breaker close command pushbutton switch 28, a dropping resistor R3 and a closing solenoid relay coil K2 to negative bus 12. This relay coil is shunted by a free-wheeling diode D6. Logic switch 24 preferably operates to disable the closing solenoid relay coil energization circuit until such time as the breaker operating mechanism is reset. In this context, its switch condition complements that of logic switch 18, and may in fact be combined with logic switch 18 so as to function in the manner of a transfer switch. In this context, logic switches 18 and 24 correspond to the single-pole, double-throw logic switch 180 disclosed in the above-noted U.S. Pat. No. 4,042,896. Logic switch 26 may be a switch whose condition complements that of logic switch 22. That is, when switch 22 is open, logic switch 26 is closed, and vice versa. It will be recalled that logic switch 22 is open while the motor operator mechanism is in its home position and closes during the execution of a charging cycle. Thus, logic switch 26 is closed while the motor operator mechanism is in its home position and is opened in response to movement of the operator mechanism away from its home position during execution of a charging cycle. Consequently, if at the conclusion of a charging cycle the breaker operating mechanism has been reset, logic switches 24 and 26 are both closed to arm the energization circuit for closing solenoid relay coil K 2. Upon closure of breaker close command pushbutton switch 28, the closing solenoid relay coil is energized to pull in its relay contacts K2a, thereby completing an energization circuit for closing solenoid CS between buses 10 and 12. A free-wheeling diode D7 is connected in shunt with closing solenoid CS. As disclosed in the above-noted patent, energization of the closing solenoid is effective in articulating a hook holding the breaker contacts in their open circuit positions against the closing force generated by the charged breaker operating mechanism. Thus, upon release of the breaker contacts by this hook, the operating mechanism partially discharges to propel the breaker contacts to their closed circuit positions.

Preferably, the relay contacts K1a and K2a are protected by arc suppression and extinguishing networks of the construction disclosed and claimed in my co-pending application Ser. No. 830,922, filed Sept. 6, 1977.

As an additional feature of the present invention, the control circuit includes a timing network, generally indicated at 30, which functions in an "anti-pumping" capacity to prevent immediate execution of another charging cycle in the event the breaker operating mechanism fails to reset during the previous charging cycle. This situation can arise due to a defect in the breaker latch or, more commonly, due to disablement of the breaker latching mechanism by an undervoltage release. It will be recalled that logic switch 18 opens when the breaker operating mechanism is reset. However, if the breaker operating mechanism is not reset during a charging cycle, this switch remains closed. For many applications, it is desired that a charging cycle be initiated automatically upon opening of the breaker contacts. To accommodate this situation, the charge command pushbutton switch contacts are jumpered, as indicated in phantom at 20a. Consequently, when the circuit breaker is tripped, logic switches 16 and 18 close, and a charging cycle is initiated forthwith. If at the completion of this charging cycle, the breaker operating mechanism has not been reset and thus logic switch 18 remains closed, the motor operator mechanism will immediately start right into another charging cycle. As long as the circuit breaker latch remains disabled, but for timing circuit 30, repetitive charging cycles would be executed indefinitely, all to the detriment of the breaker operating mechanism and the motor operator mechanism.

As seen in the drawing, the voltage at the junction between resistor R1 and relay coil K1 is applied through a diode D8 to a bus 32 where it is regulated to a desired positive operating voltage level for timing circuit 30 by a Zener diode D9. A voltage divider, consisting of resistors R4 and R5 is connected between regulated bus 32 and the negative voltage bus 12, with the junction of these two resistors connected to the gate of a programmable uni-junction transistor Q1. Also connected between buses 32 and 12 is the series combination of resistors R6, R7, and a capacitor C1. The junction between resistors R7 and capacitor C1 is connected to the anode of transistor Q1. A small capacitor C2 is connected between the anode and gate of this transistor for noise rejection purposes. A thyristor, such as a silicon controlled rectifier SCR, is connected between buses 32 and 12, with its gate connected to the cathode of transistor Q1 through a resistor R8 and also to bus 12 through resistor R9. To limit the rate of voltage rise on the anode of thyristor SCR, and thus preclude spurious triggering, a resistor R10 and a capacitor C3 are connected in series between buses 32 and 12. Resistor R10 is shunted by a diode D10 poled to accommodate rapid charging of capacitor C2 as the voltage on bus 32 comes up to the operating level determined by Zener diode D9. The charge on capacitor C3 additionally serves to maintain the regulated voltage level on bus 30 during momentary drops in the voltage across buses 10 and 12 which could otherwise produce spurious conduction of programmable uni-junction transistor Q1. In this connection, diode D8 serves to prevent capacitor C3 from discharging through relay coil K1.

From the foregoing description, it is seen that while a charging cycle is underway, the voltage on bus 32 is up at its regulated level, and capacitor C1 is being charged. When this capacitor charges to a voltage in excess of the voltage at the junction of resistors R4 and R5, transistor Q1 fires to develop a gate triggering voltage across resistor R9 sufficient to fire thyristor SCR. With the conduction of this thyristor energizing current is shunted around relay coil K1 to interrupt the breaker operating mechanism charging cycle in progress. The parameters for timing circuit 30 are selected such that ample time is afforded the motor operator mechanism to effect a successful charging cycle before capacitor C1 can charge to a level sufficient to fire transistor Q1. Upon the completion of a successful charging cycle, logic switch 22 opens to remove power from bus 32, terminating the charging of capacitor C1. In order to reset this timing circuit, the junction between resistors R6 and R7 is connected through a diode D11 to the junction between motor M and relay contacts K1b, affording a discharge path for capacitor C1 through braking resistor R2. On the other hand, if a charging cycle was not successful in resetting the breaker operating mechanism, logic switch 18 remains closed and, with the charge command switch contacts jumpered, as indicated at 20a, voltage continues to be applied to bus 32 and relay coil K1. Charging of capacitor C1 continues unabated as the motor operator mechanism goes into another charging cycle. Ultimately, capacitor C1 will charge to the voltage threshold level established for transistor Q1, and thyristor SCR is triggered to divert energizing current from relay coil K1. Relay contacts K1a open to interrupt the charging cycle in progress, and contacts K1b close to dynamically brake the motor. It will be noted that thyristor SCR will remain in its conductive state until power is removed from across buses 10, 12 or one of the logic switches 14, 16 is opened. The inclusion of back-to-back diodes D2, D3 is for the purpose of complementing the diode drops across diode D8 and thyristor D9 when the latter is conductive, thereby providing an essentially zero voltage drop across relay coil K1 to insure the dropping out of this relay when the thyristor is triggered into conduction.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A circuit for controlling a circuit breaker motor operator mechanism in executing a breaker operating mechanism charging cycle, said control circuit comprising, in combination:
A. first and second buses for connection to a source of DC voltage;
B. a relay including
   (1) an operating coil,
   (2) a first set of normally open contacts, and
   (3) a second set of normally closed contacts;
C. a DC motor connected in series with said first set of relay contacts across said first and second buses;
D. a dynamic braking resistor connected across said motor through said second set of relay contacts; and
E. means connecting said relay operating coil and said braking resistor in series across said first and second buses for the selective establishment of an energization circuit for said relay operating coil,
F. whereby upon establishment of said energization circuit, said relay is activated to initiate a charging cycle by closing said first set of relay contacts and opening said second set of relay contacts, and, upon interruption of said energization circuit, said relay is deactivated to reopen said first set of relay contacts and reclose said second set of relay contacts thereby initiating a dynamic braking cycle during which said motor generates a voltage across said braking resistor of a polarity to prevent the effective re-establishment of said energization circuit for said relay operating coil until said braking cycle has been substantially completed.

2. The control circuit defined in claim 1, wherein said braking resistor is connected in series between one terminal of said relay coil and said second bus, and said connecting means includes a voltage dropping resistor connected in series between the other terminal of said relay coil and said first bus.

3. The control circuit defined in claim 1, which further includes a timing circuit operating to limit the time interval of continuous establishment of said energization circuit for said relay operating coil.

4. The control circuit defined in claim 3, wherein said timing circuit includes:
   (1) a thyristor connected in shunt with said relay operating coil, and
   (2) means for timing the interval of establishment of said energization circuit and operating to trigger said thyristor into conduction to shunt energization current from said relay operating coil if the interval of continuous energization circuit establishment exceeds a predetermined time limit.

5. The control circuit defined in claim 4, wherein said connecting means operates to interrupt said energization circuit and to disable said timing circuit at the conclusion of a successful charging cycle.

6. The control circuit defined in claim 5, where said timing circuit includes means for resetting said timing means at the conclusion of a successful charging cycle.

7. The control circuit defined in claim 6, wherein said timing means includes:
   (1) a timing capacitor connected to receive charging current from said energization circuit upon the establishment thereof, and
   (2) a voltage threshold detector connected to monitor the charging of said timing capacitor and operating to trigger said thyristor into conduction when the voltage on said capacitor rises to a level in excess of a predetermined threshold level coordinated with said predetermined time limit imposed on the interval of continuous energization circuit establishment.

8. The control circuit defined in claim 7, wherein said resetting means includes a circuit connection accommodating the discharging of said timing capacitor through said second set of relay contacts and said braking resistor.

9. The control circuit defined in claim 8, wherein said braking resistor is connected in series between one terminal of said relay operating coil and said second bus, and the other terminal of said relay operating coil is connected through a voltage dropping resistor to said first bus, and said timing circuit is connected from the junction between said other terminal of said relay operating coil and said second bus.

* * * * *